(12) United States Patent
Cho et al.

(10) Patent No.: US 10,409,596 B2
(45) Date of Patent: Sep. 10, 2019

(54) METHOD AND APPARATUS FOR PERFORMING VECTOR OPERATIONS USING LOOK UP TABLES

(71) Applicant: SAMSUNG ELECTRONICS CO., LTD., Suwon-si (KR)

(72) Inventors: Jung-uk Cho, Hwaseong-si (KR); Suk-jin Kim, Seoul (KR); Dong-kwan Suh, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/536,351

(22) PCT Filed: Nov. 17, 2015

(86) PCT No.: PCT/KR2015/012317
§ 371 (c)(1),
(2) Date: Jun. 15, 2017

(87) PCT Pub. No.: WO2016/099036
PCT Pub. Date: Jun. 23, 2016

(65) Prior Publication Data
US 2017/0344369 A1 Nov. 30, 2017

(30) Foreign Application Priority Data
Dec. 15, 2014 (KR) .................. 10-2014-0180501

(51) Int. Cl.
*G06F 9/30* (2018.01)
*G06F 16/901* (2019.01)
*G06F 12/02* (2006.01)
*G06F 12/06* (2006.01)

(52) U.S. Cl.
CPC ........ *G06F 9/30036* (2013.01); *G06F 9/3004* (2013.01); *G06F 12/0207* (2013.01); *G06F 12/0607* (2013.01); *G06F 16/9017* (2019.01)

(58) Field of Classification Search
CPC .............. G06F 9/30036; G06F 9/3004; G06F 12/0207; G06F 12/0607; G06F 17/30952
USPC .......................................................... 711/5
See application file for complete search history.

(56) References Cited

U.S. PATENT DOCUMENTS

| | | | |
|---|---|---|---|
| 6,430,672 | B1 | 8/2002 | Dhong et al. |
| 7,093,102 | B1 | 8/2006 | Dulong |
| 7,305,540 | B1 | 12/2007 | Trivedi et al. |
| 8,191,056 | B2 | 5/2012 | Archambault et al. |
| 8,707,012 | B2 | 4/2014 | Espasa et al. |

(Continued)

FOREIGN PATENT DOCUMENTS

WO     2011075170 A1    6/2011

OTHER PUBLICATIONS

Communication dated Oct. 20, 2017 by the European Patent Office in counterpart European Patent Application No. 15870204.3.

(Continued)

*Primary Examiner* — Than Nguyen
(74) *Attorney, Agent, or Firm* — Sughrue Mion, PLLC

(57) ABSTRACT

Disclosed is an apparatus comprising: a plurality of memory banks; and a controller for generating a plurality of lookup tables storing data, needed for vector arithmetic operations, copied from data stored in the plurality of memory banks, and generating vector data by reading the data in the generated lookup tables.

18 Claims, 14 Drawing Sheets

(56) References Cited

U.S. PATENT DOCUMENTS

| | | |
|---|---|---|
| 2006/0012603 A1 | 1/2006 | Lindholm et al. |
| 2008/0082797 A1 | 4/2008 | Lo et al. |
| 2009/0150644 A1 | 6/2009 | Kwon et al. |
| 2013/0185539 A1* | 7/2013 | Hung ............... G06F 15/76 712/3 |
| 2013/0185544 A1* | 7/2013 | Hung ............... G06F 15/76 712/225 |
| 2013/0212353 A1* | 8/2013 | Mimar ............... G06F 9/345 712/4 |
| 2014/0047197 A1 | 2/2014 | Kokrady et al. |

OTHER PUBLICATIONS

Communication dated Mar. 31, 2016 issued by the International Searching Authority in counterpart International Application PCT/KR2015/012317 (PCT/ISA/220/210/237).

* cited by examiner

METHOD AND APPARATUS FOR PERFORMING VECTOR OPERATIONS USING LOOK UP TABLES

TECHNICAL FIELD

The inventive concept relates to a method and apparatus by which a processor accesses a memory, and more particularly, to a method and apparatus by which a vector processor gathers a plurality of pieces of data from a memory and scatters the plurality of pieces of data back in the memory.

BACKGROUND ART

A processor may access a memory to read data that is necessary for an operation and to store results of the operation back in the memory. For example, a processor may execute a load instruction that reads data from a memory and a store instruction that stores data in the memory.

In early processor technologies, scalar processors which employ a single instruction single data (SISD) method, which is a method of processing a single piece of data with a single instruction, have been used.

However, with the spread of smart phones and high-definition televisions, the necessity for processors capable of processing a large amount of data in fields such as image processing, vision processing, image quality processing, and graphic rendering has increased. Accordingly, vector processors which employ a single instruction multiple data (SIMD) method, which is a method of processing a plurality of pieces of data with a single instruction, have been generalized. A vector processor is a processor for repeatedly performing the same operation at a high speed on a plurality of pieces of data constituting a vector. The vector processor may simultaneously read and process a plurality of pieces of data from a memory and then store a result thereof back in the memory.

When a vector processor simultaneously reads a plurality of pieces of data from a memory or stores the plurality of pieces of data in the memory, the vector processor frequently accesses the same memory bank. In this case, a memory bank conflict causes a stall, and thus performance of a system is degraded.

Therefore, in order for the vector processor to simultaneously read the plurality of pieces of data from the memory or to store the plurality of pieces of data in the memory, dedicated hardware may be additionally required to predict memory bank conflicts and to minimize the occurrence of the conflictions by scheduling memory accesses of the vector processor based on the prediction.

However, the additional hardware may increase an overall area of the processor and increase design complexity. Also, complex implementation in software may cause another performance degradation of the processor.

TECHNICAL PROBLEM

The inventive concept provides a method and apparatus by which a processor reads a plurality of pieces of data in the form of a lookup table from a memory or stores the plurality of pieces of data in the form of a lookup table in the memory.

Further, the inventive concept provides a computer readable recording medium in which a program for causing a computer to execute the method is recorded. Technical objectives of embodiments of the inventive concept are not limited to the above objectives, and other objectives can be deduced from the following embodiments.

BEST MODE

TECHNICAL SOLUTION

Figure 1:
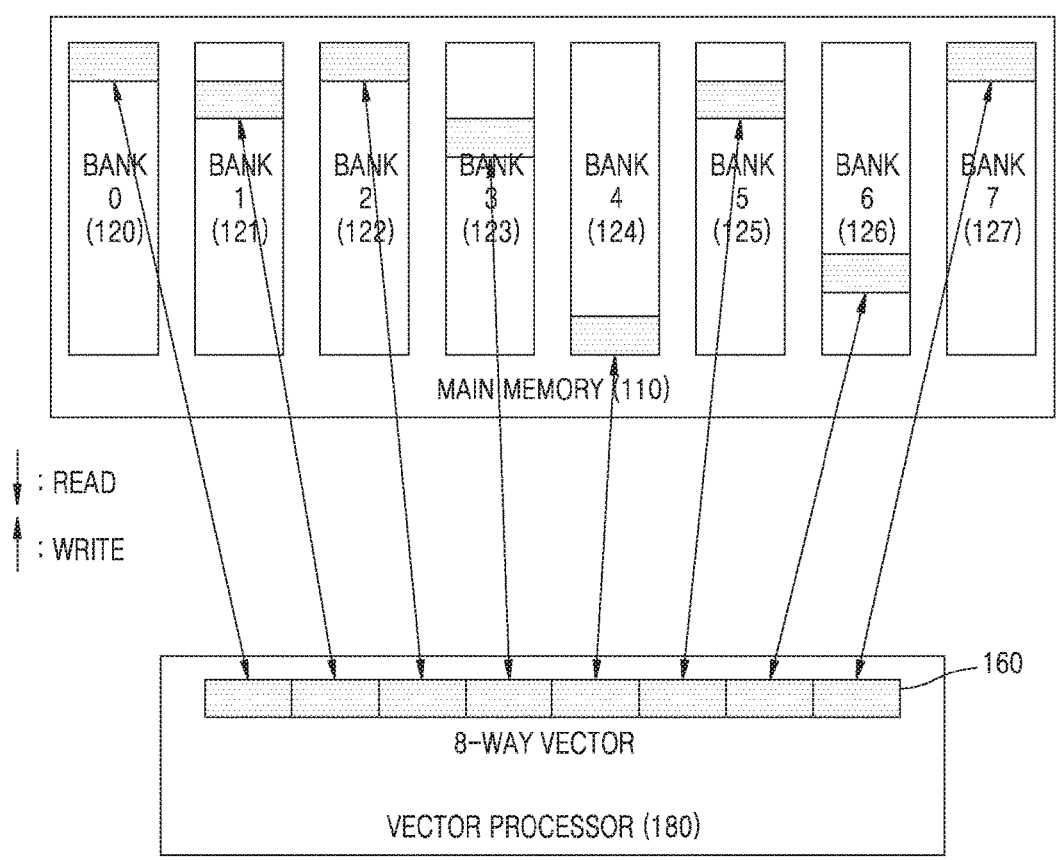
FIG. 1 is a diagram illustrating a structure in which a vector processor according to one embodiment reads and writes data from and to a memory.

According to an aspect of the inventive concept, there is provided an apparatus including a plurality of memory banks, and a controller configured to generate a plurality of lookup tables in which data that is necessary for a vector operation among data stored in the plurality of memory banks is copied and stored, and to generate vector data by reading the data from the plurality of lookup tables.

The controller may include a lookup table generating unit configured to generate the plurality of lookup tables, and a gather unit configured to read the data from the plurality of lookup tables and generate the vector data.

The controller may generate one lookup table for each of the plurality of memory banks, wherein a number of the generated lookup table is same as the number of the plurality of memory banks.

The controller may divide the plurality of memory banks into a predetermined number of groups and generate one lookup table for each of the groups, and the one lookup table generated for each of the groups may be stored in a plurality of memory banks included in the group in an interleaving form.

The controller may access each of the lookup tables using an index vector including a plurality of randomly generated indexes and read data stored at positions of the indexes in each of the lookup tables.

The controller may divide result vector data obtained by performing a predetermined vector operation on the vector data into elements and store the result vector divided by elements in the plurality of lookup tables.

The controller may store each of the elements at a predetermined index position in each of the lookup tables.

When a value of data stored in a first index in any one of the plurality of lookup tables is changed, the controller may update data stored in a first index in each of the remaining lookup tables, whose value is not changed, with the changed value.

The apparatus may further include a switching unit including a plurality of sub-switch units corresponding to the lookup tables, wherein the plurality of sub-switch units may determine whether to allow the controller to access a predetermined index position of each of the lookup tables.

The plurality of sub-switch units may include a plurality of switches corresponding to each of the plurality of memory banks, and each of the switches may determine whether the controller is accessible the each of the plurality of memory banks.

According to another aspect of the inventive concept, there is provided a method including generating a plurality of lookup tables in which data that is necessary for a vector operation among data stored in a plurality of memory banks is copied and stored, and generating vector data by reading the data from the lookup tables.

The generating of the lookup tables may include generating one lookup table for each of the plurality of memory banks, wherein a number of the generated lookup table is same as the number of the plurality of memory banks in each memory banks.

The generating of the lookup tables may include dividing the plurality of memory banks into a predetermined number of groups and generating one lookup table for each of the groups, and storing the one lookup table generated for each of the groups in a plurality of memory banks included in the group in an interleaving form.

The generating of the vector data by reading the data from the lookup tables may include accessing each of the lookup tables using an index vector including a plurality of randomly generated indexes and reading data stored at positions of the indexes in each of the lookup tables.

The method may further include dividing result vector data obtained by performing a predetermined vector operation on the vector data into elements and storing the result vector divided by elements in the plurality of lookup tables.

The storing of the result vector divided by elements in the plurality of lookup tables may include storing each of the elements at a predetermined index position in each of the lookup tables.

The storing of the result vector divided by elements in the plurality of lookup tables may include, when a value of data stored in a first index in any one of the plurality of lookup tables is changed, updating data stored in a first index in each of the remaining lookup tables, whose value is not changed, with the changed value.

The generating of the vector data by reading the data from the lookup tables may include generating the vector data by reading data present at a predetermined index position that is allowed to be accessed in each of the lookup tables, and the storing of the result vector divided by elements in the plurality of lookup tables may include storing the result vector data at the predetermined index position that is allowed to be accessed in each of the lookup tables.

The generating of the vector data by reading the data from the lookup table and the storing of the result vector divided by elements in the plurality of lookup tables may include determining whether to allow access to each of the memory banks.

According to still another aspect of the inventive concept, there is provided a computer readable recording medium in which a program for causing a computer to execute the method is recorded.

DETAILED DESCRIPTION OF THE INVENTION

Hereinafter, embodiments will be described in detail with reference to the drawings. Since the embodiments described in this specification and configurations illustrated in the drawings are only exemplary embodiments of the inventive concept and do not represent the overall technological scope of the inventive concept, it should be understood that the inventive concept covers various equivalents, modifications, and substitutions at the time of filing of this application.

FIG. 1 is a diagram illustrating a structure in which a vector processor according to one embodiment reads and writes data from and to a memory.

A main memory 110 may be a random access memory (RAM) that constitutes a computer, a TV, a mobile phone, a mobile device, and the like, but the inventive concept is not limited thereto.

Hereinafter, the term "main memory" refers to all or some areas of a memory constituting a memory device of a predetermined machine. The main memory 110 according to one embodiment may have a multi-bank structure including one or more memory banks (hereinafter referred to as "banks") to minimize memory conflicts.

A vector processor 180 may be a processor capable of simultaneously processing a plurality of pieces of data, and instructions in the vector processor 180 may be processed in the form of single instruction multiple data (SIMD) or multiple instruction multiple data (MIMD), but the inventive concept is not limited thereto.

The vector processor 180 may read a plurality of pieces of data from the main memory 110, generate a plurality of pieces of data in the form of a vector, perform a vector operation thereon, and store a result of the vector operation back in the main memory 110. The vector processor 180 may access a plurality of banks 120, 121, 122, 123, 124, 125, 126, and 127 in the main memory 110 to read or store the plurality of pieces of data simultaneously.

The vector processor 180 may include a vector register 160. The vector register 160 is a register which may store an address of a memory for accessing elements constituting a vector operation and may read or write through a vector instruction.

The vector register 160 may be partitioned into a plurality of elements. For example, when a 16-byte vector register 160 stores an 8-way vector, the vector register 160 may be composed of eight elements and one element may have a size of 2 bytes.

Although not illustrated in FIG. 1, the vector processor 180 may include a vector functional unit for performing an operation every clock with a pipelined architecture, a vector load/store unit for reading and storing data from a memory, a scalar register for storing a memory address and a control signal, and a cross-bar for connecting registers.

The vector processor 180 according to one embodiment may use various methods to access the main memory 110 in order to read a plurality of pieces of data from the main memory 110 or to write a plurality of pieces of data to the main memory 110.

For example, the vector processor 180 may sequentially read a plurality of pieces of data from the main memory 110 while incrementing a memory address by one, and generate the plurality of pieces of data in the form of a vector. The vector processor 180 may use a unit stride technique that performs a vector operation using the generated vector and sequentially stores results of the performed vector operation back in the main memory 110.

Also, for example, the vector processor 180 may read a plurality of pieces of data from the main memory 110 while incrementing a memory address by a constant value stored in a scalar register (not illustrated), and generate the plurality of pieces of data in the form of a vector. The vector processor 180 may use a stride access technique that performs a vector operation using the generated vector and stores results obtained by performing the vector operation back in the main memory 110 while incrementing the memory address by the constant value in the same method.

Also, for example, the vector processor 180 may randomly read data from the main memory 110 and generate a plurality of pieces of the read data in the form of a vector. The vector processor 180 may use an indexed load and store technique that performs a vector operation using the generated vector and randomly stores results obtained by performing the vector operation back in the main memory 110. The indexed load and store technique is a technique of reading scattered data in the main memory 110 using an index vector to generate a vector and storing results of the vector operation back in the main memory 110.

Generally, reading a plurality of pieces of data scattered in the main memory 110 using an index vector is referred to as a gather, and scattering and storing a plurality of pieces of data (i.e., a vector) in the main memory 110 using an index vector is referred to as a scatter.

The vector processor 180 according to one embodiment may read a plurality of pieces of data at memory addresses calculated by adding a plurality of offset values stored in an index vector to a base address to perform a gather thereon, and may store the plurality of pieces of data in the vector register 160 in the form of a vector.

For example, in the vector processor 180 that performs an 8-way vector operation, eight indexes, that is, relative addresses of a memory in which eight pieces of data are stored, may be stored in an index vector, and the vector processor 180 may read data of a corresponding address by adding the eight indexes to the base address. The eight pieces of read data are stored in the vector register 160 in the form of a vector.

A process of performing a scatter is a reverse process of a gather. The vector stored in the vector register 160 is divided into eight elements and the eight elements are stored at memory addresses obtained by adding offsets of the index vector to the base address.

However, when the vector processor 180 simultaneously reads or stores a plurality of pieces of data while performing a gather and a scatter, the vector processor 180 may frequently access the same memory bank. In this case, a memory bank conflict may cause a stall, and thus performance and efficiency of the vector processor may be significantly degraded.

As described above, the vector processor 180 needs to simultaneously access the main memory 110 to read the plurality of pieces of data from the main memory 110 and store the plurality of pieces of data in the main memory 110. Therefore, in order for the vector processor 180 to simultaneously access the main memory 110, the main memory 110 may have a multi-memory bank structure, and the vector processor 180 may additionally require a memory system (not illustrated) that may independently control addresses of memory banks.

Figure 2:
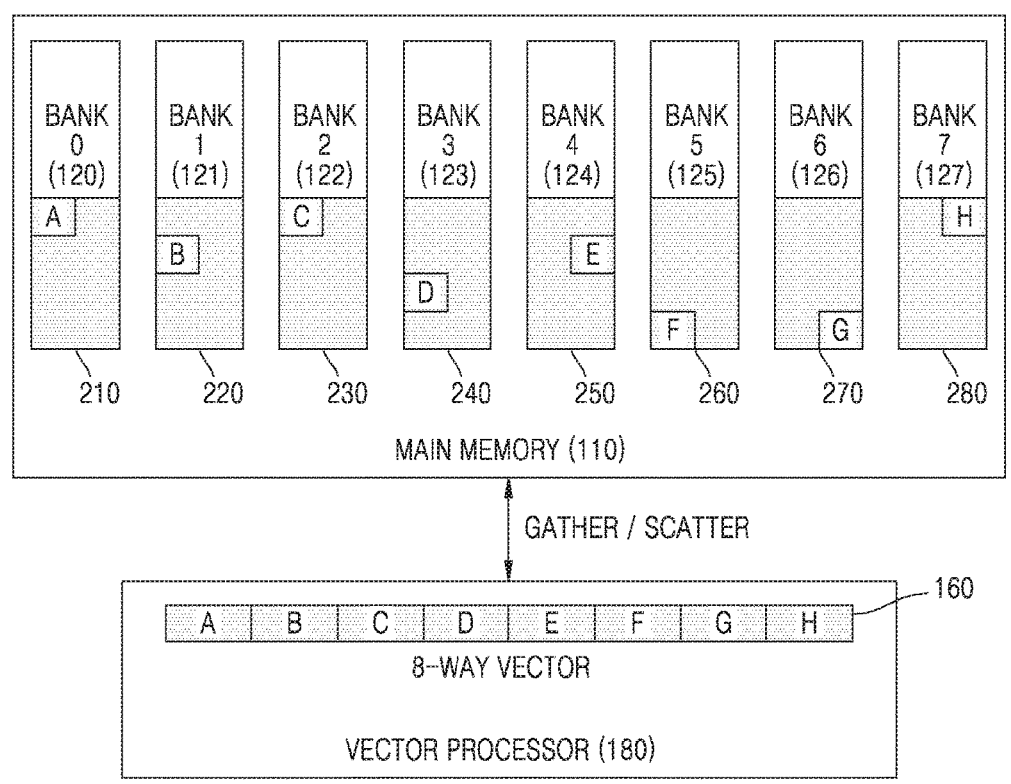
FIG. 2 is a diagram illustrating a method by which a vector processor according to one embodiment performs a gather and a scatter.

FIG. 2 is a diagram illustrating a method by which a vector processor according to one embodiment performs a gather and a scatter.

The vector processor 180 may generate a plurality of lookup tables (shaded portions) 210, 220, 230, 240, 250, 260, 270, and 280 in which data that is necessary for a vector operation among pieces of data stored in the main memory 110 is copied and stored. The main memory 110 has a multi-bank structure including a plurality of memory banks.

The vector processor 180 may gather a plurality of pieces of data stored at a predetermined index position of each of the lookup tables from the generated lookup tables 210, 220, 230, 240, 250, 260, 270, and 280, and generate the plurality of pieces of data in the form of a vector.

The vector processor 180 according to one embodiment may gather a plurality of pieces of data A, B, C, D, E, F, G, and H from the lookup tables 210, 220, 230, 240, 250, 260, 270, and 280, respectively. The plurality of pieces of gathered data A, B, C, D, E, F, G, and H may be stored in the vector register 160 in the form of a vector, and the vector in the vector register 160 may be an operand of a vector operation.

The vector processor 180 may divide the vector stored in the vector register 160 into elements and scatter the vector divided by elements at a predetermined index position in each of the lookup tables 210, 220, 230, 240, 250, 260, 270, and 280. The vector in the vector register 160, which is an object of the scattering, may be result vector data obtained by performing a predetermined vector operation on the gathered and generated vector data.

As described above, when a memory bank conflict occurs while the vector processor 180 accesses the plurality of banks of the main memory 110 to perform a gather and a scatter, performance of the vector processor 180 is significantly degraded. Hereinafter, methods in which the vector processor 180 according to one embodiment performs a gather and a scatter using lookup tables to reduce the number of memory bank conflicts will be described in detail with reference to FIGS. 3 to 10.

Figure 3:
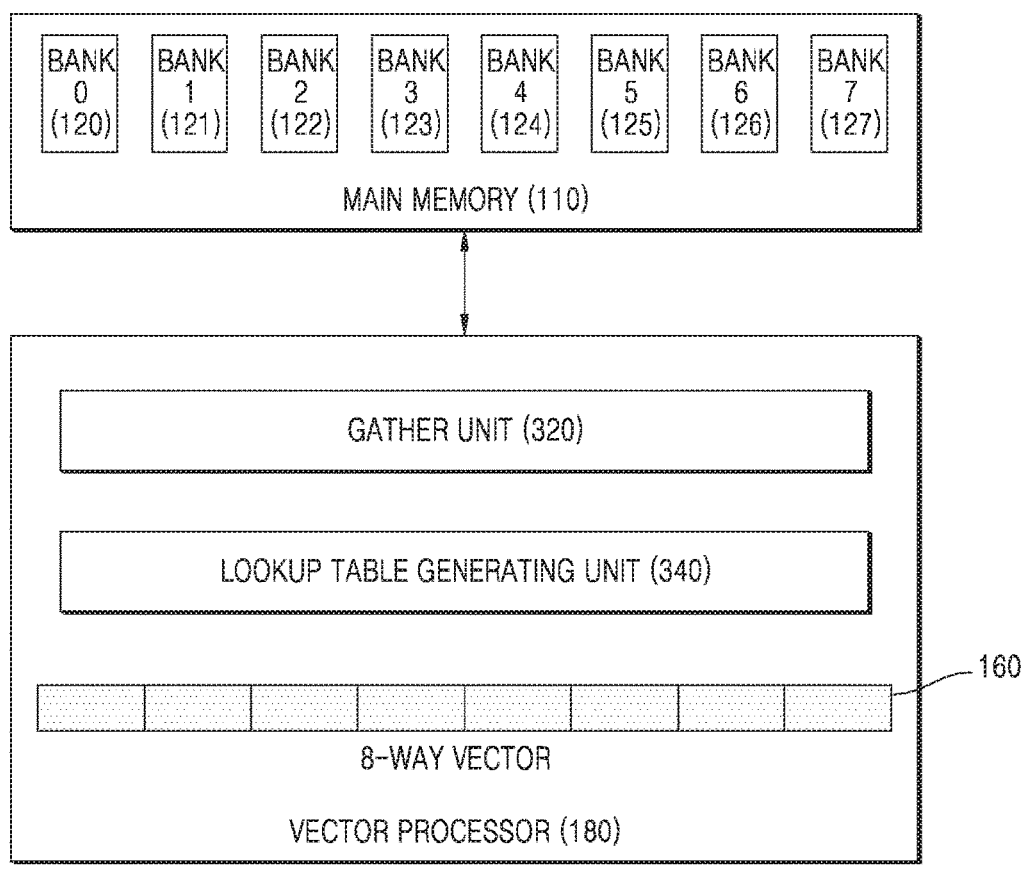
FIG. 3 is a diagram illustrating a structure of a vector processor according to one embodiment.

FIG. 3 is a diagram illustrating a structure of a vector processor according to one embodiment.

As described above, the main memory 110 may have a multi-bank structure. For convenience of description, it is assumed that the main memory 110 includes eight banks 120, 121, 122, 123, 124, 125, 126, and 127 and a vector processor 180 performs an 8-way vector operation.

In FIG. 3, it is illustrated that the vector processor 180 performs an 8-way vector operation and the vector register 160 stores an 8-way vector, but the inventive concept is not limited thereto. It should be apparent that the vector processor 180 and the vector register 160 may process and store an n-way vector.

The vector processor 180 according to one embodiment may include a gather unit 320 and a lookup table generating unit 340. Also, the vector processor 180 may include a controller (not illustrated) including the gather unit 320 and the lookup table generating unit 340.

The lookup table generating unit 340 according to one embodiment may generate a plurality of lookup tables. The lookup table generating unit 340 may generate one lookup table for each of the banks 120, 121, 122, 123, 124, 125, 126, and 127 in the main memory 110, or may group a predetermined number of banks into one group and generate one lookup table for each group. That is, the lookup table generating unit 340 may divide the plurality of banks in the main memory 110 into N groups and generate one lookup table for each of the groups. N is an integer greater than 1.

The lookup table refers to a table in which data that is necessary for a vector operation currently being performed in the main memory 110 is copied and stored. For example, improving quality of an 8K ultra high definition (UHD) image is required, 16×16 Gaussian filters may be applied in a raster order of the image. The 256 Gaussian coefficients necessary for applying the 16×16 Gaussian filters may be scattered and stored in the main memory 110. The lookup table generating unit 340 according to one embodiment may generate a plurality of lookup tables, in which pieces of data for all Gaussian coefficients which are scattered and present in the main memory 110 are copied and stored, in an initialization step before performing image quality improvement.

Figure 4:
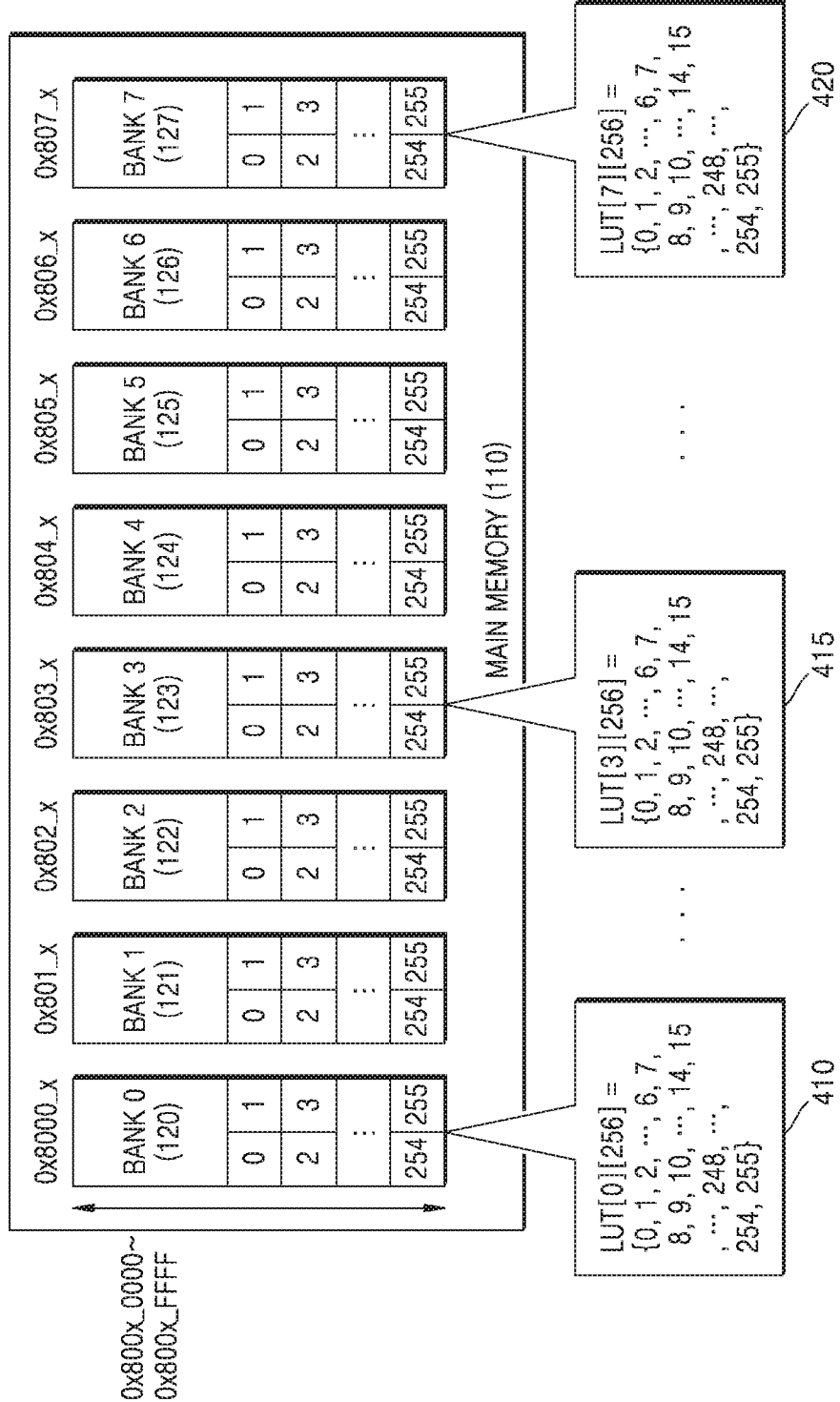
FIG. 4 is a diagram illustrating a plurality of lookup tables generated in a main memory according to one embodiment.

The lookup table generating unit 340 according to one embodiment may generate identical lookup tables for the eight banks 120, 121, 122, 123, 124, 125, 126, and 127 as illustrated in FIG. 4. In this case, eight lookup tables are generated, and the eight generated lookup tables may be stored in the eight banks 120, 121, 122, 123, 124, 125, 126, and 127, respectively.

Figure 5:
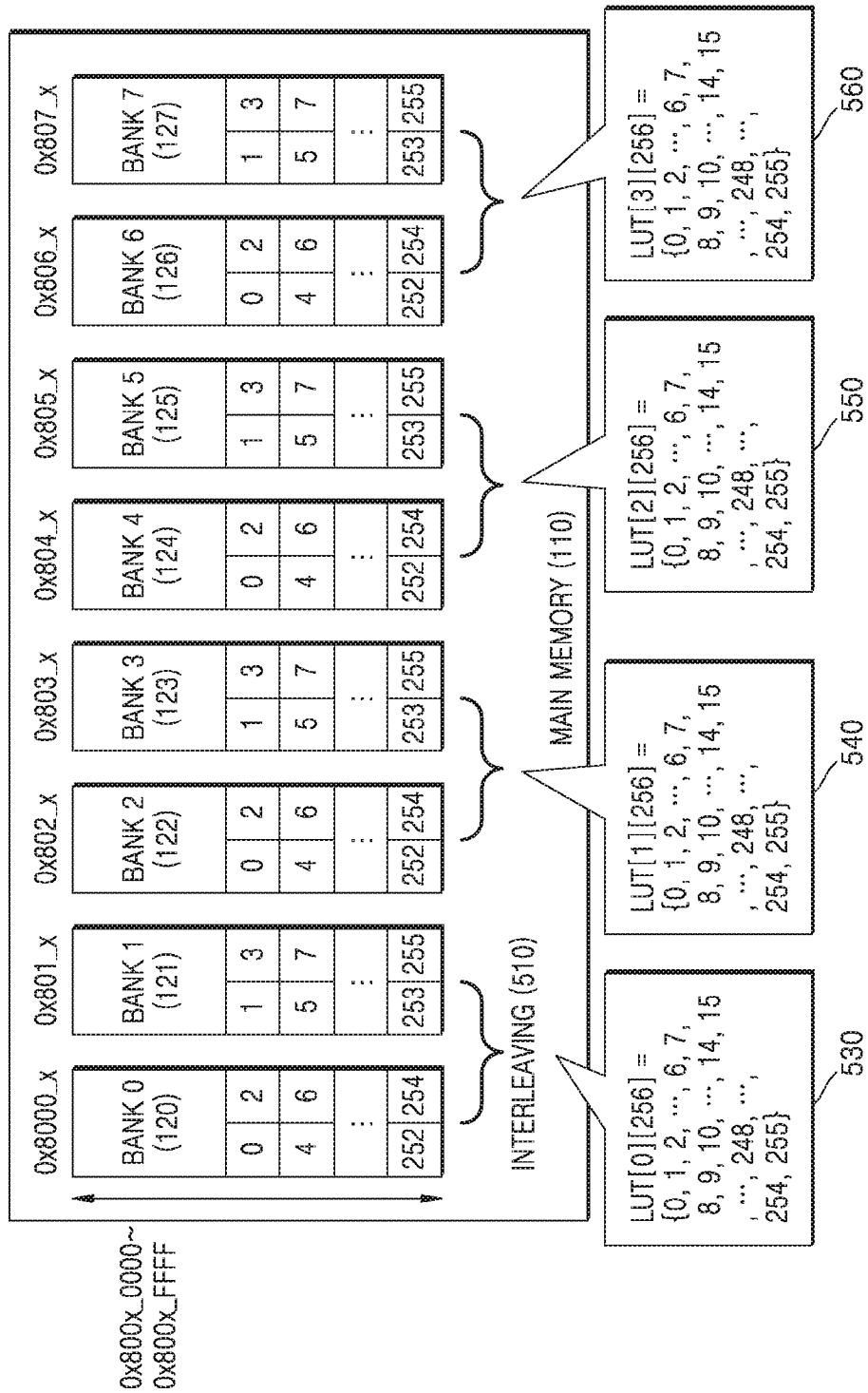
FIG. 5 is a diagram illustrating a plurality of lookup tables generated in a main memory according to one embodiment.

Also, as illustrated in FIG. 5, the lookup table generating unit 340 according to one embodiment may group the banks of the main memory 110 into a first group (including a bank 0 120 and a bank 1 121), a second group (including a bank 2 122 and a bank 3 123), a third group (including a bank 4 124 and a bank 5 125), and a fourth group (including a bank 6 126 and a bank 7 127), and generate one lookup table for each of the groups. In this case, four lookup tables are generated, and the four generated lookup tables may be divided and stored in two banks.

Also, the lookup table generating unit 340 according to one embodiment may group the banks of the main memory 110 into a first group (including a bank 0 120, a bank 1 121, a bank 2 122, and a bank 3 123), and a second group (including a bank 4 124, a bank 5 125, a bank 6 126, and a bank 7 127), and generate one lookup table for each of the groups. In this case, two lookup tables are generated.

The lookup table generating unit 340 according to one embodiment may determine the number of lookup tables that will be generated in consideration of a space in the main memory 110, which stores the lookup table, and the number of memory bank conflicts occurring when the vector processor 180 accesses the lookup tables. That is, since each of the lookup tables requires a storage space in the main memory 110 and the number of conflicts occurring in the banks decreases as the number of the generated lookup tables increases, there is a trade-off between the number of lookup tables and the number of memory bank conflicts.

In other words, when the lookup table generating unit 340 generates lookup tables corresponding to the number of the banks 120, 121, 122, 123, 124, 125, 126, and 127 and the gather unit 320 generates a vector including the same number of elements as the number of banks, only one access is performed on one memory bank even when a plurality of pieces of data are simultaneously randomly read. In this case, there is no memory bank conflict but a space which stores the lookup tables is maximized. However, when one lookup table is generated for each predetermined number of banks, the number of memory bank conflicts may be increased but the space which stores the lookup tables may be reduced.

When the performance of the vector processor 180 is important, the lookup table generating unit 340 may generate the maximum number of lookup tables (i.e., for each bank) and may group a predetermined number of banks into one group to generate one lookup table for each group in consideration of a storage space in which the lookup table will be stored. When the lookup table generating unit 340 groups the predetermined number of banks into one group to generate one lookup table for each group, the lookup tables may be stored in the plurality of memory banks in an interleaving form. The process of the lookup table generating unit will be described in detail with reference to FIG. 5.

The gather unit 320 may read a plurality of pieces of data from the main memory 110 using the lookup tables. The plurality of pieces of data may be stored in the vector register 160 in the form of a vector. The gather unit 320 may access an index position of the each of lookup tables present in the main memory 110 using an index vector including a plurality of indexes randomly generated when accessing the plurality of lookup tables.

For example, the gather unit 320 may generate an 8-way vector using an index vector including eight indexes. More specifically, the gather unit 320 may access a predetermined index position of each of the lookup tables using a memory address obtained by adding each offset stored in the index vector to a base address to read data therefrom.

The gather unit 320 may read the data from the plurality of lookup tables and generate vector data by gathering all of the data constituting the vector after a predetermined reading cycle.

FIG. 4 is a diagram illustrating a plurality of lookup tables generated in a main memory according to one embodiment.

The main memory 110 according to one embodiment has a size of 512 KB (a range from 0x800x_0000 to 0x800x_FFFF), and each of the banks 120, 121, 122, 123, 124, 125, 126, and 127 has a size of 64 KB. Values of 0x8000x to 0x807x illustrated at the tops of the banks 120, 121, 122, 123, 124, 125, 126, and 127 in FIG. 4 are respectively referred to as memory start addresses of the banks.

As described above, the lookup table may be generated for each of the eight banks, or may be generated for each group by grouping a predetermined number of banks into one group. A plurality of lookup tables may be generated by the lookup table generating unit 340.

FIG. 4 illustrates a case in which a lookup table is generated for each of eight banks, and FIG. 5 illustrates a case in which one lookup table is generated for two banks.

In FIG. 4, only lookup tables 410, 415, and 420 for the bank 0 120, the bank 3 123, and the bank 7 127 among the eight banks are illustrated and the remaining lookup tables are omitted. Also, for convenience of description, data in each of the lookup tables 410, 415, and 420 is illustrated as having the same value as each index.

The lookup table generating unit 340 according to one embodiment may generate lookup tables in the form of a two-dimensional (2D) array. That is, when the number of generated lookup tables is I and the number of pieces of data that is necessary for a vector operation is J, a lookup table may be generated as a 2D array of I×J. The lookup tables may be distinguished by different top addresses.

The 2D array may be generated in the initialization step before the vector processor 180 performs a vector operation. In FIG. 4, since lookup tables are generated for all eight of the banks 120, 121, 122, 123, 124, 125, 126, and 127, eight lookup tables may be generated. Since each of the lookup tables includes 256 pieces of data, a 2D array of 8×256 may be declared.

The vector processor 180 according to one embodiment may perform a gather using software codes illustrated in the following Table 1. It should be apparent that the software codes in Table 1 are only one embodiment for performing the gather and may be implemented in other forms.

TABLE 1

```
ushort8 _|_intr_gather8_uh(ushort8 _|_src1, uchar** _|_src2)
{
    ushort8 ret;
    ret = (ushort8)(0, 0, 0, 0, 0, 0, 0, 0);
        ret.s0 = _|_src2[0][_|_src1 .s0];
        ret.s1 = _|_src2[1][_|_src1 .s1];
        ret.s2 = _|_src2[2][_|_src1 .s2];
        ret.s3 = _|_src2[3][_|_src1 .s3];
        ret.s4 = _|_src2[4][_|_src1 .s4];
        ret.s5 = _|_src2[5][_|_src1 .s5];
        ret.s6 = _|_src2[6][_|_src1 .s6];
        ret.s7 = _|_src2[7][_|_src1 .s7];
    return ret;
}
```

Referring to the codes in Table 1, "ret" denotes a vector generated by performing a gather operation. The "ret" vector denotes an 8-way vector including unsigned short type data. That is, an "I_intr_gather8_uh" function illustrated in Table 1 may read data from eight banks using eight indexes to generate a vector.

"_I_src1" denotes an 8-way index vector including eight indexes composed of unsigned short type data. "_I_src1.s0" to "_I_src1.s7" may denote index positions at which pieces of data which will be read from the each of the lookup tables are present, and may be randomly generated indexes.

"_I_src2" denotes lookup tables declared as an unsigned character type 2D array. Only one access is performed on each of the lookup tables (e.g., "_I_src2[0:7]"). For example, data may be read from a lookup table of "_I_src2 [0]" using an index of "_I_src1.s0," and data may be read from a lookup table of "_I_src2[1]" using an index of "_I_src1.s1." That is, data may be read using different indexes for each lookup table. That is, since eight pieces of data are read from different banks even when a plurality of pieces of data are read from the main memory 110 using the randomly generated index vector, a memory bank conflict does not occur.

FIG. 5 is a diagram illustrating a plurality of lookup tables generated in a main memory according to one embodiment.

That is, a lookup table 530 for the bank 0 120 and the bank 1 121 may be generated, a lookup table 540 for the bank 2 122 and the bank 3 123 may be generated, a lookup table 550 for the bank 4 124 and the bank 5 125 may be generated, and a lookup table 560 for the bank 6 126 and the bank 7 127 may be generated.

Each of the four generated lookup tables is divided and stored in two banks. For example, the lookup table 530 may be divided and stored in the bank 0 120 and the bank 1 121, and the lookup table 550 may be divided and stored in the bank 4 124 and the bank 5 125.

The lookup table according to one embodiment may be stored in a plurality of banks in an interleaving form 510. That is, since pieces of data located in adjacent memories are alternately stored in two different banks, memory bank conflicts may be minimized. For example, pieces of data of indexes of {0, 2, 4, . . . , 252, and 254} may be stored in the bank 0 120 and pieces of data of indexes of {1, 3, 5, . . . , 253, and 255} may be stored in the bank 1 121.

The vector processor 180 according to one embodiment may perform a gather operation using software codes illustrated in the following Table 2. It should be apparent that the software codes in Table 2 are only one embodiment for performing the gather operation and may be implemented in other forms.

TABLE 2

```
ushort8 _|_intr_gather8_uh(ushort8 _|_src1 , uchar** _|_src2)
{
    ushort8 ret;
    ret = (ushort8)(0, 0, 0, 0, 0, 0, 0, 0);
        ret.s0 = _|_src2[0][_|_src1 .s0];
        ret.s1 = _|_src2[0][_|_src1 .s1];
        ret.s2 = _|_src2[1][_|_src1 .s2];
        ret.s3 = _|_src2[1][_|_src1 .s3];
        ret.s4 = _|_src2[2][_|_src1 .s4];
        ret.s5 = _|_src2[2][_|_src1 .s5];
        ret.s6 = _|_src2[3][_|_src1 .s6];
        ret.s7 = _|_src2[3][_|_src1 .s7];
    return ret;
}
```

In the codes in Table 2, since variables are the same as those in Table 1, descriptions thereof will be omitted. A difference from Table 1 is that two elements among eight elements constituting the finally returned vector "ret" are generated by referring to the same lookup table. For example, first and second elements of "ret" are pieces of data which are read by referring to the lookup table 530, and third and fourth elements thereof are pieces of data which are read by referring to the lookup table 540.

Since the plurality of elements refer to one lookup table when the number of generated lookup tables is reduced, the number of memory bank conflicts is increased. However, as described above, when the one lookup table present in the plurality of banks is implemented in an interleaving form, the number of memory bank conflicts may be minimized.

As illustrated in FIG. 5, the lookup table is implemented in an interleaving form 510 in which pieces of data of even-numbered indexes are stored in the bank 0 120, the bank 2 122, the bank 4 124, and the bank 6 126 and pieces of data of odd-numbered indexes are stored in the bank 1 121, the bank 3 123, the bank 5 125, and the bank 7 127. When a calling index vector is an 8-way vector including {an even number, an odd number, an even number, an odd number, an even number, an odd number, an even number, an odd number}, a memory bank conflict does not occur.

Figure 6A:
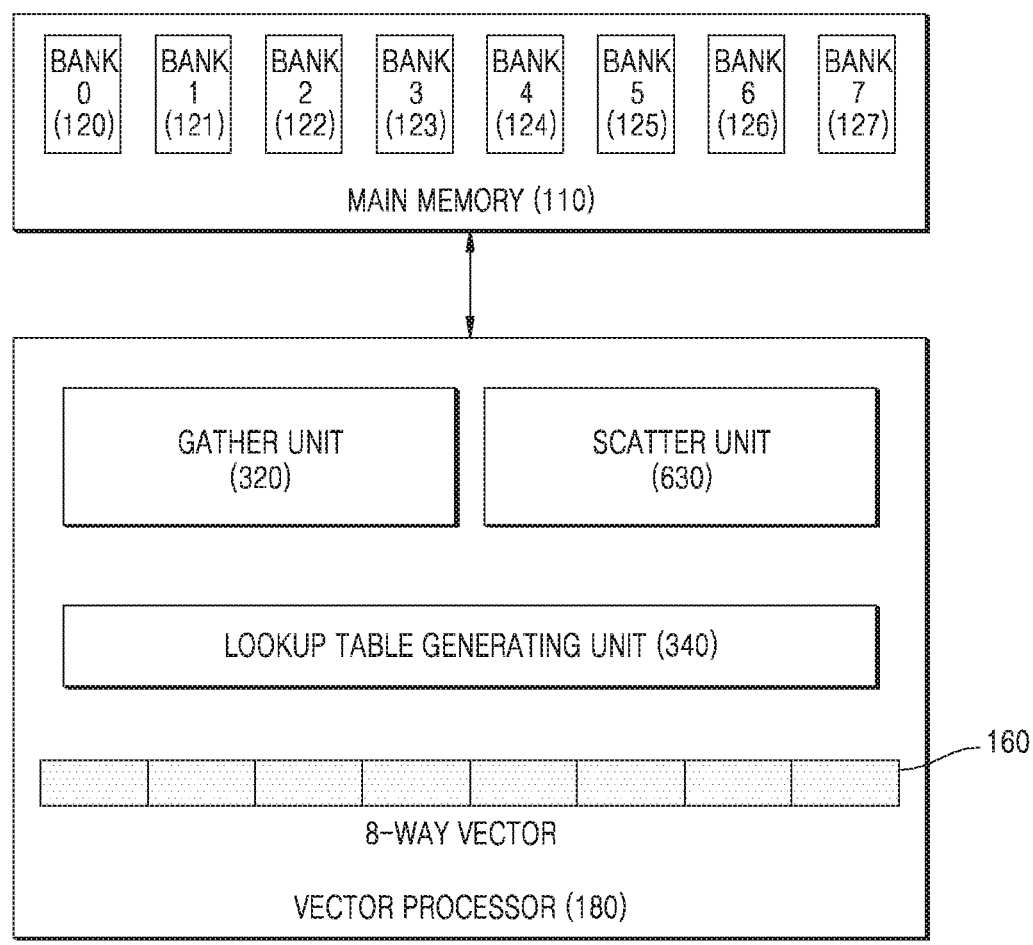
FIG. 6A is a diagram illustrating a structure of a vector processor according to one embodiment.

FIG. 6A is a diagram illustrating a structure of a vector processor according to one embodiment.

The vector processor 180 according to one embodiment may include the gather unit 320, the lookup table generating unit 340, and a scatter unit 630. Since the gather unit 320 and the lookup table generating unit 340 have been described above with reference to FIG. 3, descriptions thereof will be omitted.

The scatter unit 630 performs a process corresponding to a reverse process of the process performed by the gather unit 320. Therefore, even though the content of the gather unit 320 and the lookup table generating unit 340 described in FIGS. 2 to 5 is omitted below, the content is applied to the scatter unit 630 according to the embodiment of FIG. 6 in the same manner.

The scatter unit 630 may divide vector data stored in the vector register 160 into elements and store the vector divided by elements back in the plurality of lookup tables. Result vector data obtained by performing a predetermined vector operation on the vector data generated by the gather unit 320 may be stored in the vector register 160.

The scatter unit 630 according to one embodiment may perform a scatter using software codes illustrated in the following Table 3. It should be apparent that the software codes in Table 3 are only one embodiment for performing the scatter operation and may be implemented in other forms.

TABLE 3

```
void _|_intr_scatter8_uh(ushort8 _|_src1 , ushort** _|_src2,
ushort8_|_src3)
{
    _|_src2[0][_|_src1 .s0]= _|_src3.s0;
    _|_src2[1][_|_src1 .s1]= _|_src3.s1;
    _|_src2[2][_|_src1 .s2]= _|_src3.s2;
    _|_src2[3][_|_src1 .s3]= _|_src3.s3;
    _|_src2[4][_|_src1 .s4]= _|_src3.s4;
    _|_src2[5][_|_src1 .s5]= _|_src3.s5;
    _|_src2[6][_|_src1 .s6]= _|_src3.s6;
    _|_src2[7][_|_src1 .s7]= _|_src3.s7;
}
```

Referring to the codes in Table 3, a "_intr_scatter8_uh" function may divide a vector (an 8-way vector) stored in the vector register 160 into elements and store the vector divided by elements at a predetermined position of the lookup table generated for each bank. "_I_src3" denotes a vector stored in the vector register 160, and may store a result vector obtained by performing a vector operation. "_I_src3" denotes an 8-way vector including unsigned integer type data.

"_I_src1" denotes an 8-way index vector including unsigned short type data. For example, the "_intr_scatter8_uh" function may store "_I_src3.s3" at a position of "_I_src1.s3" of a lookup table "_I_src2[3]."

Figure 6B:
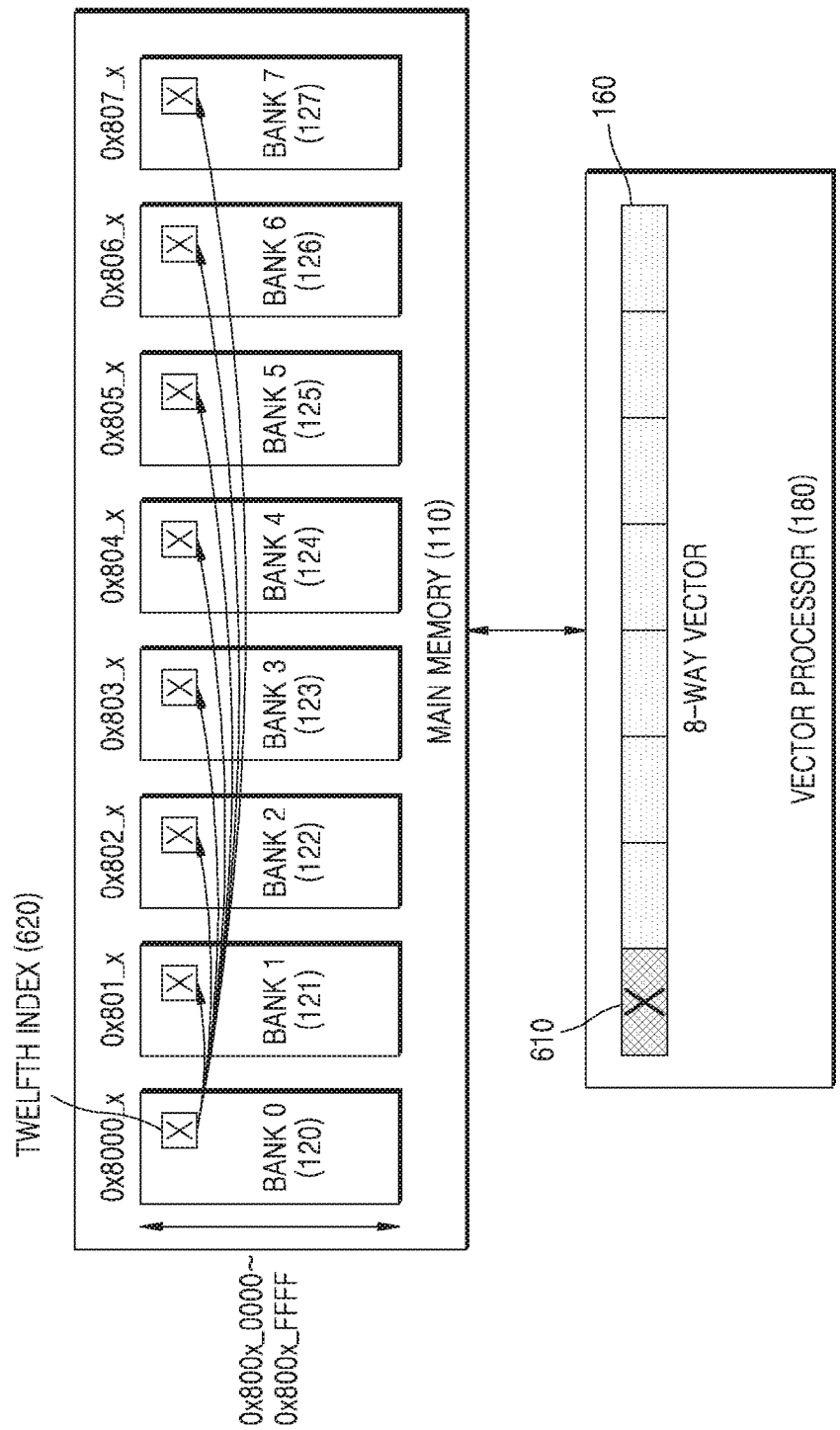
FIG. 6B is a diagram illustrating a method by which a vector processor according to one embodiment synchronizes a plurality of lookup tables.

FIG. 6B is a diagram illustrating a method by which a vector processor according to one embodiment synchronizes a plurality of lookup tables.

As described above, since the lookup table generating unit 340 generates a plurality of the identical lookup tables in the initialization step, pieces of data of the plurality of lookup tables may be synchronized with each other. That is, unlike the gather unit 320, the scatter unit 630 may change values stored at a predetermined index position of each of the respective lookup tables, and update values stored at the same index position of different lookup tables with the changed value. The synchronization between the lookup tables may be implemented by a switching unit 745 which will be described with reference to FIG. 7.

In other words, when values of elements of a vector stored in the vector register 160 are changed and a value stored at a predetermined index of a predetermined lookup table is updated, the scatter unit 630 may also update pieces of data stored at predetermined indexes of the remaining lookup tables with the same value.

For example, when a value of a twelfth index 620 of the bank 0 120 is changed to X after a vector operation is performed, a value of a twelfth index position of each of the remaining banks 120, 121, 123, 124, 125, 126, and 127 may also be updated with the same X.

However, the scatter unit 630 does not necessarily change the values of all of the lookup tables to the same value in all cases, and may selectively perform a scatter operation using a switching unit 745 which will be described below with reference to FIGS. 8 to 10.

Figure 7:
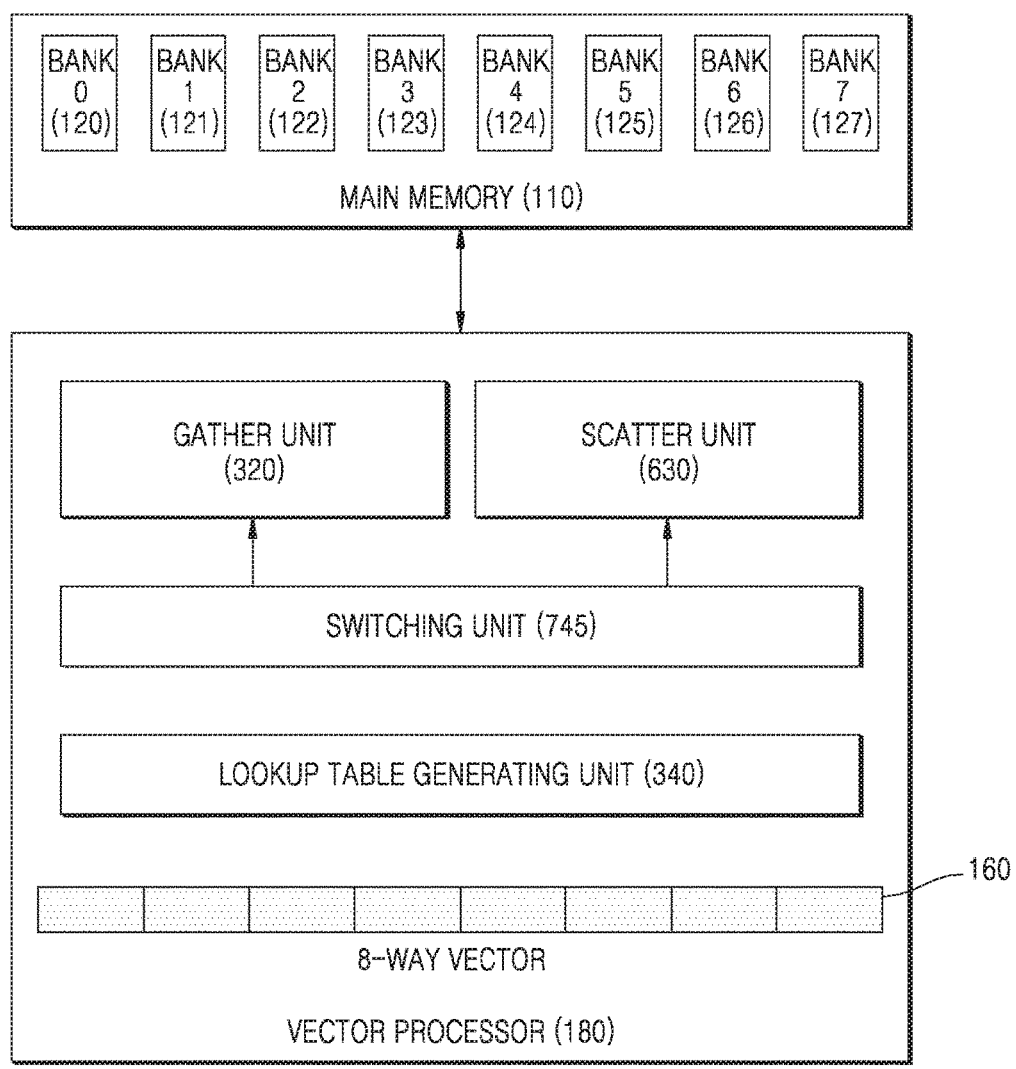
FIG. 7 is a diagram illustrating a structure of a vector processor according to one embodiment.

FIG. 7 is a diagram illustrating a structure of a vector processor according to one embodiment.

The vector processor according to the embodiment may include the gather unit 320, the scatter unit 630, the switching unit 745, and the lookup table generating unit 340.

The switching unit 745 may control access of the gather unit 320 and the scatter unit 630 to each bank to determine whether to perform a gather and a scatter on a predetermined index position of each lookup table. The switching unit 745 may include a sub-switch unit (not illustrated) corresponding to each of the lookup tables, and the sub-switch units may determine whether to allow the gather unit 320 and the scatter unit 630 to access predetermined index positions in the banks in which the lookup tables are present.

Each of the sub-switch units may have an on/off switch for each bank in which a plurality of lookup tables are present. That is, each of the sub-switch units may include the same number of switches as the number of banks, and the switches may determine whether the gather unit 320 and the scatter unit 630 may access each of the banks.

When the sub-switch unit turns off the switch for a predetermined bank, the gather unit 320 may not read data from the turned-off bank and the scatter unit 630 may also not store data in the turned-off bank. Also, when the switch for the predetermined bank is turned on, the gather unit 320 and the scatter unit 630 may respectively perform a gather and a scatter on a predetermined index position of the turned-on bank.

For example, when there are eight banks in the main memory 110, one lookup table is generated for each bank, and there are eight lookup tables, the switching unit 745 may include eight sub-switch units, and each of the sub-switch units may include the same number of switches as the number of banks. When it is necessary to synchronize a plurality of identical lookup tables, the vector processor 180 may appropriately turn on the switches in each of the sub-switch units in the switching unit 745 and perform a scatter on the plurality of identical lookup tables. The process of vector processor 180 will be described below with reference to FIG. 9.

Also, when the vector processor 180 gathers one or two pieces of data from each of the lookup tables to generate data in the form of a vector, the vector processor 180 may set only one or two switches in each of the sub-switch units in the switching unit 745 to be turned-on and perform a gather on the one or two switches. The process of vector processor 180 will be described below with reference to FIGS. 8A and 8B.

Figure 8A:
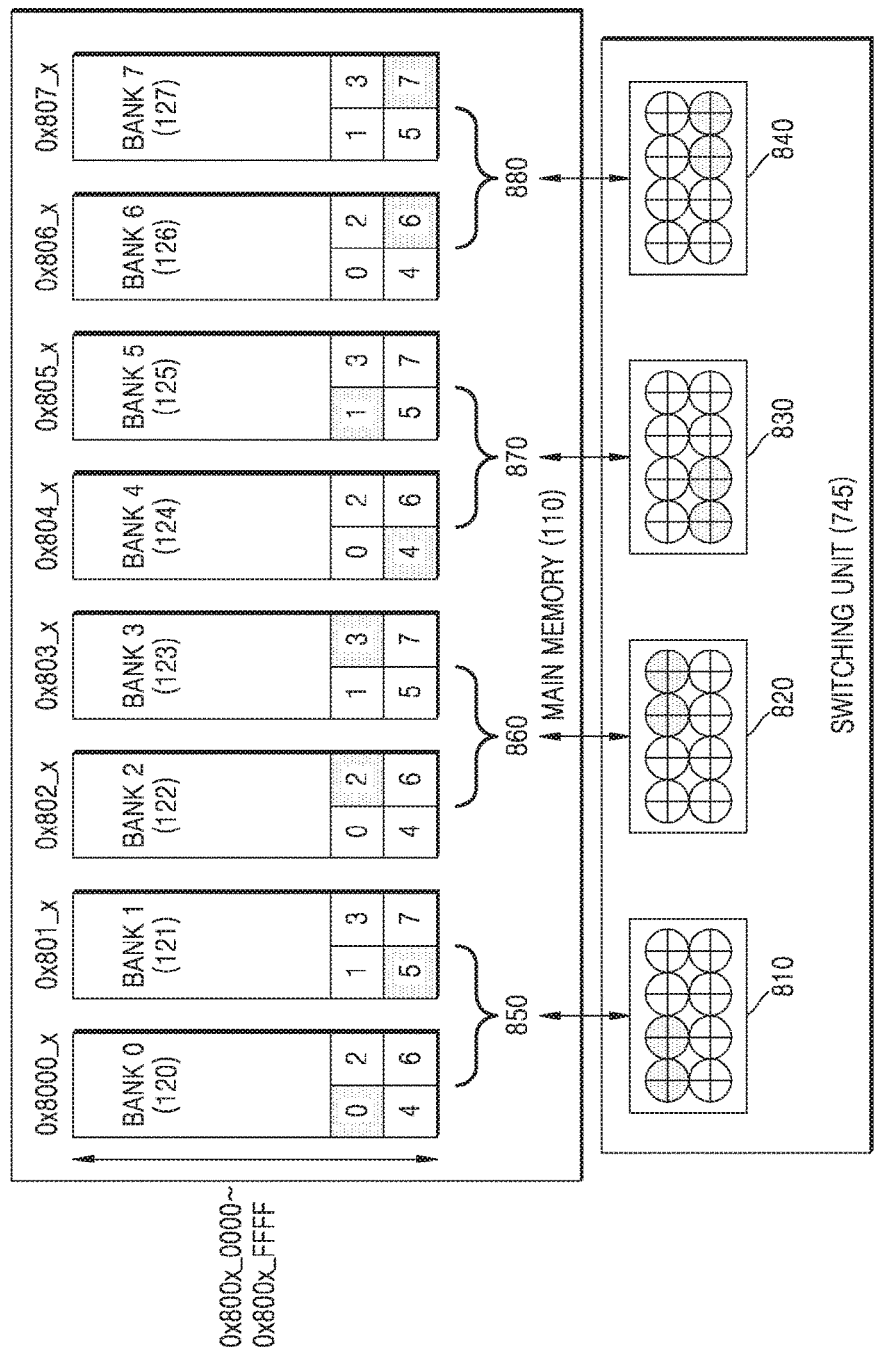
FIG. 8A is a diagram illustrating a method by which a vector processor according to one embodiment performs a gather.

FIG. 8A is a diagram illustrating a method by which a vector processor according to one embodiment performs a gather.

For convenience of description, it is assumed that the number of pieces of data that is necessary for a vector operation is eight and that each lookup table is stored in two banks in an interleaving form. For example, a lookup table 850 is stored in the bank 0 120 and the bank 1 121 in an interleaving form. The gather unit 320 may gather two pieces of data for each lookup table to generate an 8-way vector.

The switching unit 745 may include four sub-switch units 810, 820, 830, and 840 corresponding to the lookup tables. Each of the sub-switch units 810, 820, 830, and 840 may include the same number of switches as the number of the banks 120, 121, 122, 123, 124, 125, 126, and 127. An uppermost left switch in each of the sub-switch units 810, 820, 830, and 840 may control access to the bank 0 120, and a lowermost right switch therein may control access to the bank 7 127.

The switches which are set to be turned-on among the switches in each of the sub-switch units 810, 820, 830, and 840 are shaded. Hereinafter, the uppermost left switch in the sub-switch unit is referred to as a first switch, and the switches are numbered in order from left to right and from top to bottom. That is, the lowermost right switch in each of the sub-switch units 810, 820, 830, and 840 is an eighth switch.

The gather unit 320 according to one embodiment may read pieces of data of index 0 and index 5 of the lookup table 850 which are respectively stored in the bank 0 120 and the bank 1 121 using the sub-switch unit 810 in which the first and second switches are turned on. Also, for example, the gather unit 320 may read pieces of data of index 4 and index 1 of the lookup table 870 which are respectively stored in the bank 4 124 and the bank 5 125 using the sub-switch unit 830 in which the fifth and sixth switches are turned on.

Figure 8B:
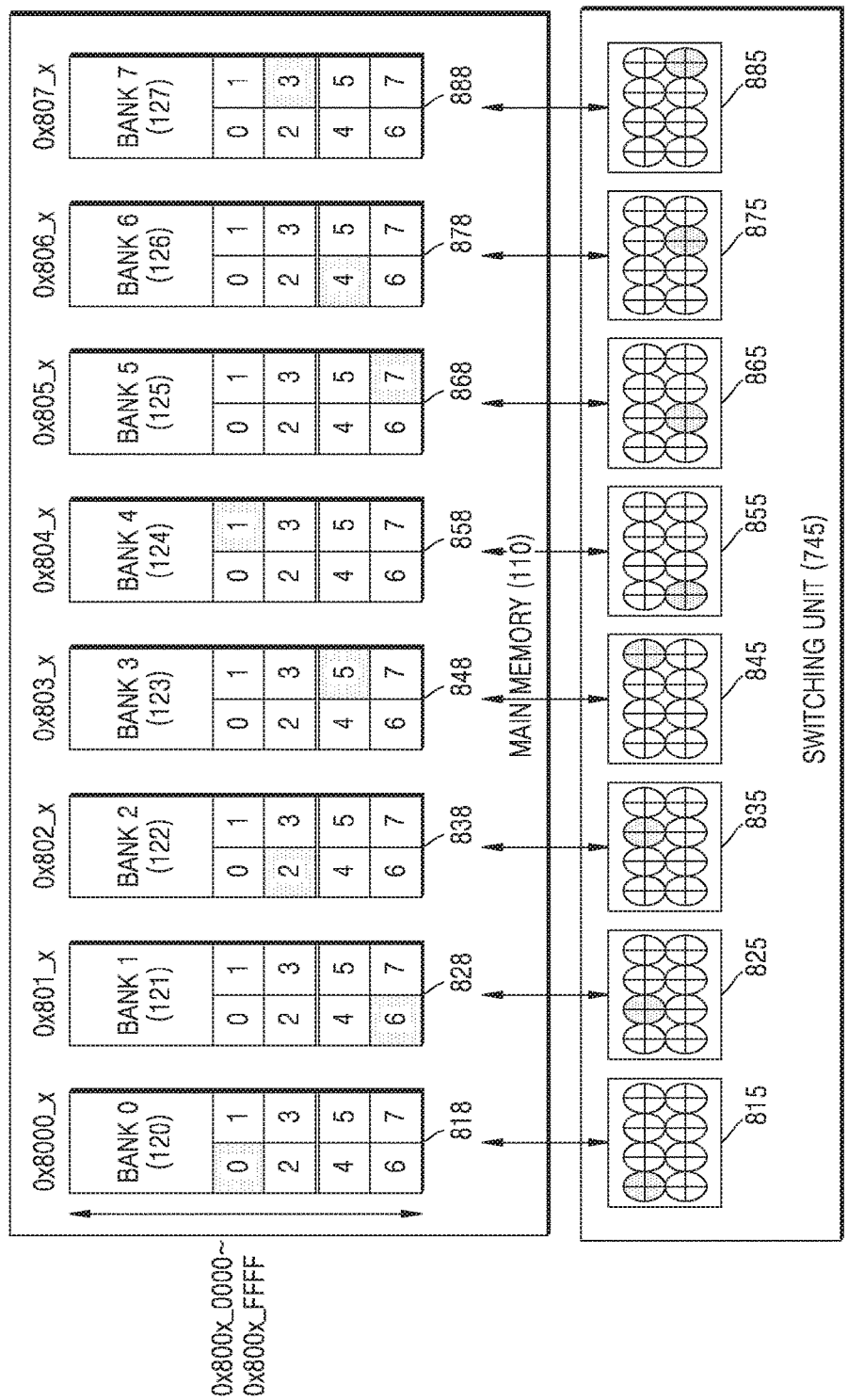
FIG. 8B is a diagram illustrating a method by which a vector processor according to one embodiment performs a gather.

FIG. 8B is a diagram illustrating a method by which a vector processor according to one embodiment performs a gather.

FIG. 8B illustrates a case in which a lookup table is generated for each of the banks 120, 121, 122, 123, 124, 125, 126, or 127. The switching unit 745 may include eight sub-switch units 815, 825, 835, 845, 855, 865, 875, and 885 corresponding to the respective lookup tables. Each of the sub-switch units 815, 825, 835, 845, 855, 865, 875, and 885 may include eight switches equal to the number of banks.

The vector processor 180 according to one embodiment may set only one switch among the eight switches included in each of the sub-switch units 815, 825, 835, 845, 855, 865, 875, and 885 to be turned on, and read one piece of data present at a predetermined index position of each of lookup tables 818, 828, 838, 848, 858, 868, 878, and 888.

For example, the gather unit 320 may read data stored at an index 0 of the lookup table 818 stored in the bank 0 120 using the sub-switch unit 815 in which the first switch is turned on, and may read data stored at an index 7 of the lookup table 868 stored in the bank 5 125 using the sub-switch unit 865 in which the sixth switch is turned on.

Figure 9:
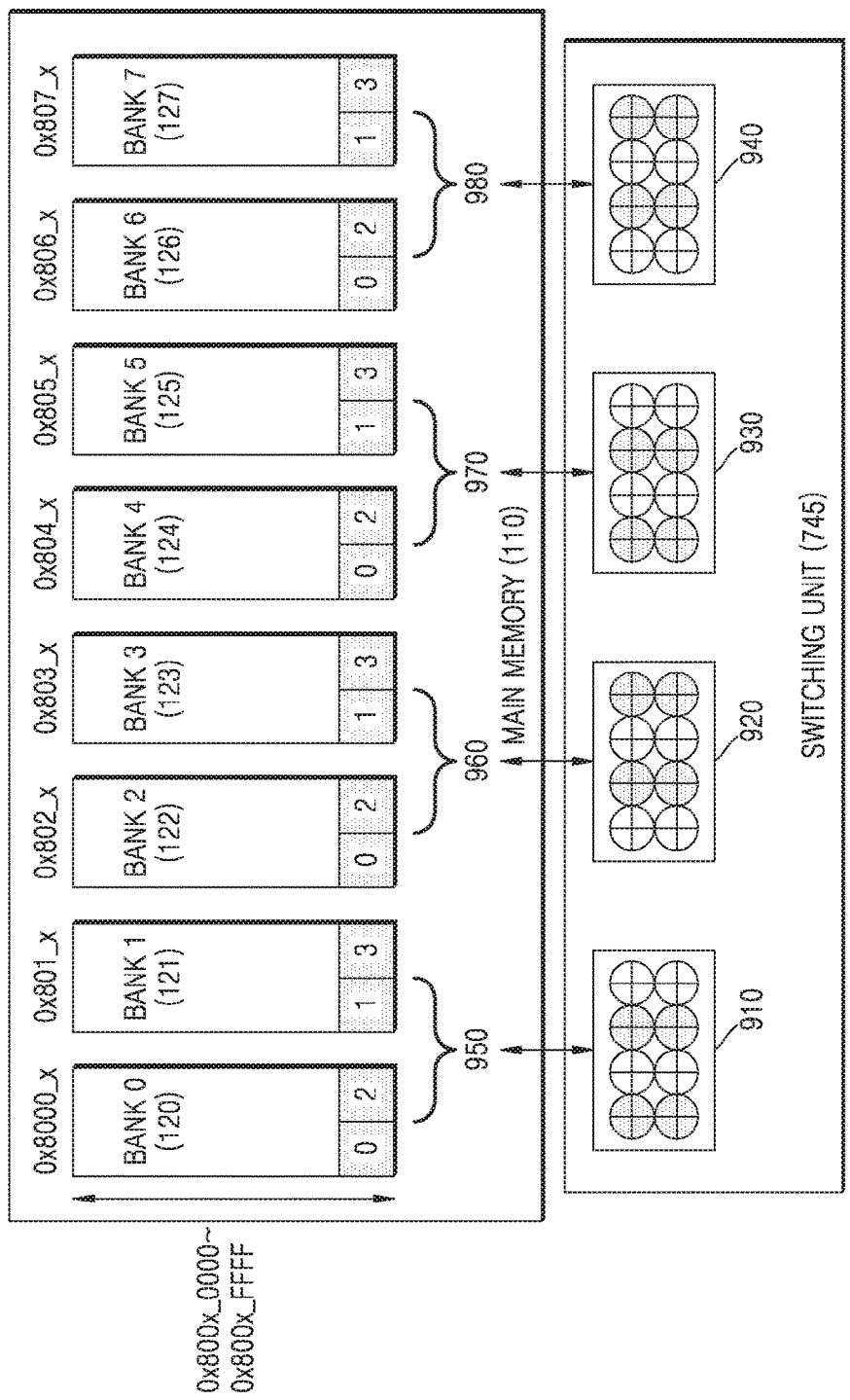
FIG. 9 is a diagram illustrating a method by which a vector processor according to one embodiment performs a scatter.

FIG. 9 is a diagram illustrating a method by which a vector processor according to one embodiment performs a scatter.

For convenience of description, it is assumed that one lookup table stores four pieces of data and is stored in two banks in an interleaving form. For example, a lookup table 950 is stored in the bank 0 120 and the bank 1 121 in an interleaving form. That is, indexes 0 and 2 of the lookup tables are present in the even-number banks 120, 122, 124, and 126, and indexes 1 and 3 thereof are present in the odd-number banks 121, 123, 125, and 127.

The scatter unit 630 according to one embodiment may divide a vector stored in the vector register 160 into elements and scatter and store the vector divided by elements in lookup tables 950, 960, 970, and 980.

For example, it is assumed that a vector previously stored in the vector register 160 is a 4-way vector and all elements of the vector are updated after a vector operation is performed. The scatter unit 630 may store a first element of the 4-way vector in the lookup table 950, store a second element in the lookup table 960, store a third element in the lookup table 970, and store a fourth element in the lookup table 980. That is, the four elements may be scattered and stored in different indexes of the respective lookup tables 950, 960, 970, and 980.

However, as described above, synchronization of a plurality of lookup tables may be required. The vector processor 180 may appropriately set eight switches present in each of sub-switch units 910, 920, 930, and 940 to be turned on, and perform a scatter on all index positions in the respective lookup tables.

That is, the first, third, fifth, and seventh switches of the sub-switch unit 910 may be turned on to store data in the index 2 of each of the lookup tables 950, 960, 970, and 980.

Also, the second, fourth, sixth, and eighth switches of the sub-switch unit 920 may be turned on to store data in the index 3 of each of the lookup tables 950, 960, 970, and 980.

Also, the first, third, fifth, and seventh switches of the sub-switch unit 930 may be turned on to store data in the index 0 of each of the lookup tables 950, 960, 970, and 980.

Also, the second, fourth, sixth, and eighth switches of the sub-switch unit 940 may be turned on to store data in the index 1 of each of the lookup tables 950, 960, 970, and 980.

As a result, all pieces of data stored in the indexes 0 to 3 in each of the lookup tables 950, 960, 970, and 980 may be updated.

It should be apparent that the vector processor 180 may set only some of the switches of each of the sub-switch units 910, 920, 930, and 940 to be turned on and perform a scatter on the look up tables when there is no need to synchronize the lookup tables. For example, although not illustrated in FIG. 9, only the first switch of the sub-switch unit 910 may be turned on to store the data at a position of the index 2 of the lookup table 950 stored in the bank 0 120. Also, only the fourth switch of the sub-switch unit 920 may be turned on to store the data at a position of the index 3 of the lookup table 960 stored in the bank 3 123. Also, only the fifth switch of the sub-switch unit 930 may be turned on to store the data at a position of the index 0 of the lookup table 970 stored in the bank 4 124. Also, only the eighth switch of the sub-switch unit 940 may be turned on to store the data at a position of the index 1 of the lookup table 980 stored in the bank 7 127.

The gather unit 320, the scatter unit 630, the switching unit 745, and the lookup table generating unit 340 according to one embodiment may be implemented by generating lookup tables and expanding only a load and store operation of the vector processor without changing a structure of the vector processor 180. Therefore, the gather unit 320, the scatter unit 630, the switching unit 745, and the lookup table generating unit 340 according to the embodiment may be implemented in an intrinsic form in which an instruction set architecture (ISA) of the vector processor 180 is not changed, and thus may be implemented without modifying the structure of the vector processor 180 or without additional hardware.

Hereinafter, a method by which the vector processor 180 according to one embodiment accesses a memory and performs data gather and scatter will be described with reference to flowcharts in FIGS. 10 to 13. FIGS. 10 to 13 are flowcharts for describing a method by which the vector processor 180 illustrated in FIGS. 1 to 9 performs a gather and a scatter. Therefore, even though the content described above with respect to the vector processor 180 in FIGS. 1 to 9 is omitted, the content is applied to the gather and scatter methods according to embodiments of FIGS. 10 to 13.

Figure 10:
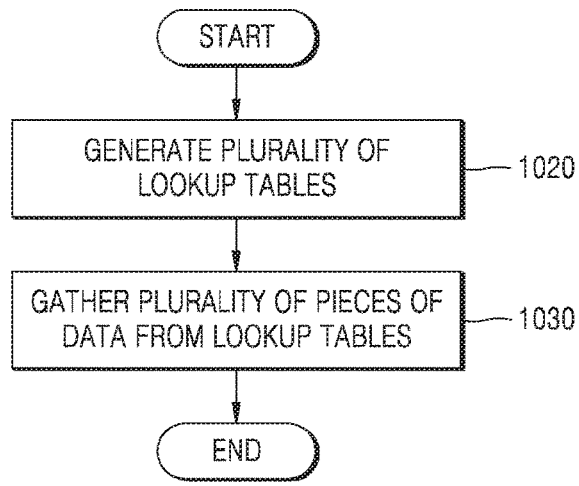
FIG. 10 is a flowchart illustrating a method by which a vector processor according to one embodiment performs a gather.

FIG. 10 is a flowchart illustrating a method by which a vector processor according to one embodiment performs a gather.

In step 1020, the vector processor 180 may generate a plurality of lookup tables for a main memory. The lookup table refers to a table in which data that is necessary for a vector operation currently being performed among data stored in the main memory is copied and stored. The main memory may have a multi-bank structure. The generated lookup tables may be stored in each bank or may be divided and stored in a plurality of banks.

In step 1030, the vector processor 180 may perform a gather for reading a plurality of pieces of data from the lookup table and generating vector data. More specifically, the vector processor 180 according to one embodiment may perform a gather operation of reading a plurality of pieces of data from the main memory using the generated lookup tables and storing the plurality of pieces of data in a vector register in the form of a vector.

In step 1030, the vector processor 180 may access an index position of the each of the lookup tables present in the main memory using an index vector including a plurality of randomly generated indexes to read the data.

Figure 11:
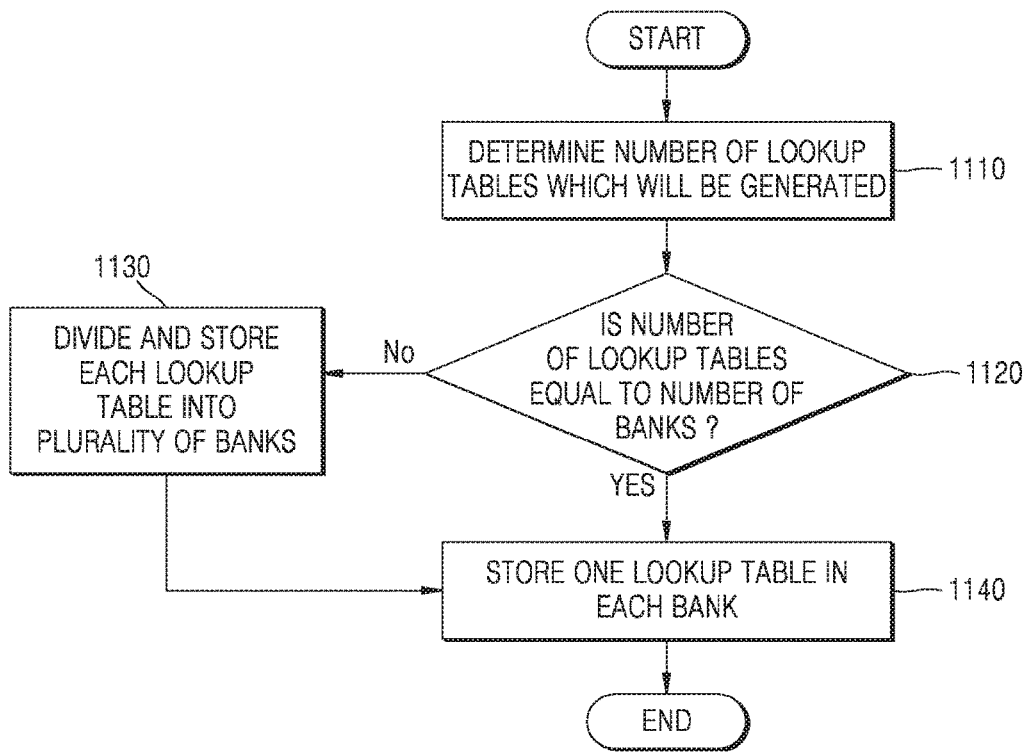
FIG. 11 is a flowchart illustrating a method by which a vector processor according to one embodiment generates a plurality of lookup tables.

FIG. 11 is a flowchart illustrating a method by which a vector processor according to one embodiment generates a plurality of lookup tables.

In step 1110, the vector processor 180 may determine the number of lookup tables which will be generated. The vector processor 180 according to one embodiment may determine the number of lookup tables which will be generated in consideration of a trade-off between a space in a main memory which stores the lookup tables and the number of memory conflicts caused by the vector processor accessing the lookup table.

In step 1120, the vector processor 180 determines whether to generate the same number of lookup tables as the number of memory banks. When it is determined that the number of generated lookup tables will be equal to the number of memory banks, the process proceeds to step 1140, otherwise the process proceeds to step 1130.

In step 1130, the vector processor 180 may divide and store each of the generated lookup tables into a plurality of banks. The vector processor 180 according to one embodiment may divide and store each of the lookup tables into a plurality of banks in an interleaving form. That is, a plurality of pieces of data may be alternately stored in different banks so that memory bank conflicts may be minimized.

In step 1140, the vector processor 180 may generate one lookup table for each bank. The lookup tables are respectively stored in the banks.

Figure 12:
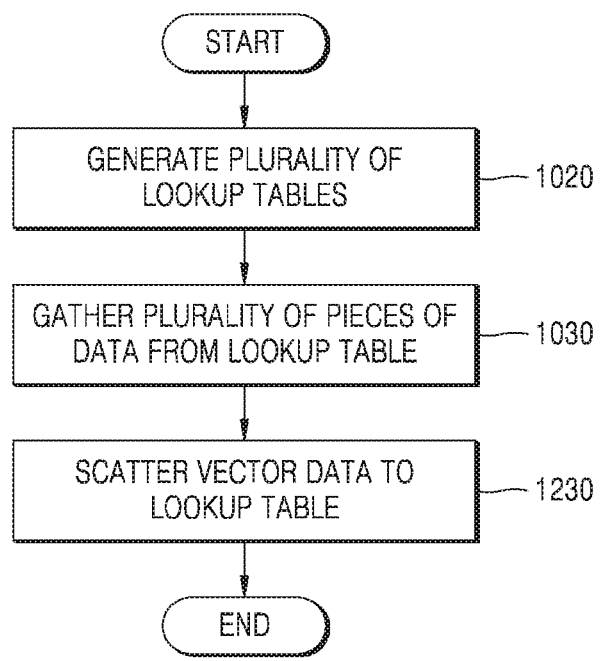
FIG. 12 is a flowchart illustrating a method by which a vector processor according to one embodiment performs a scatter.

FIG. 12 is a flowchart illustrating a method by which a vector processor according to one embodiment performs a scatter.

Since steps 1020 and 1030 have been described with reference to FIG. 10, descriptions thereof will be omitted.

The vector processor 180 according to one embodiment may perform a scatter for scattering and storing vector data in a lookup table.

In step 1230, the vector processor 180 according to one embodiment may divide a vector stored in a vector register into elements to store the elements back in a lookup table. The vector stored in the vector register may perform a vector operation on the vector generated in step 1030, result vector data obtained by performing the operation is stored, and the result vector data may be stored back in a plurality of lookup tables in step 1230.

In step 1230, when the vector processor 180 according to the embodiment updates a value stored in a predetermined index of a predetermined lookup table in order to synchronize lookup tables, data stored in the predetermined index of each of the remaining lookup tables may also be updated with the same value.

Figure 13:
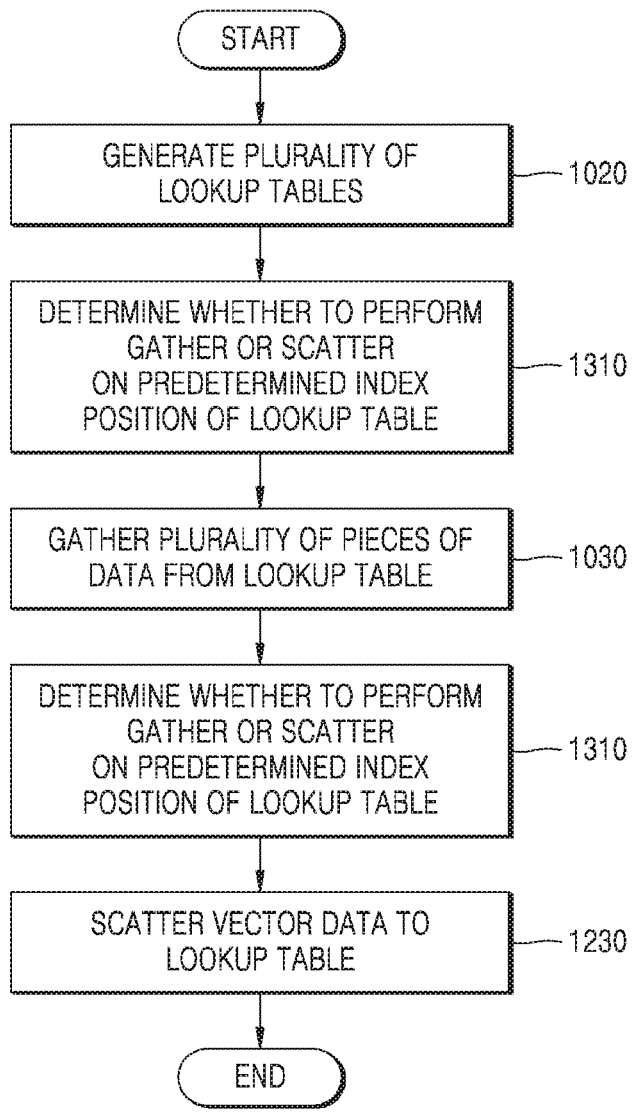
FIG. 13 is a flowchart illustrating a method by which a vector processor according to one embodiment performs a gather and a scatter.

FIG. 13 is a flowchart illustrating a method by which a vector processor according to one embodiment performs a gather and a scatter.

Since steps 1020, 1030, and 1230 have been described with reference to FIGS. 10 and 12, descriptions thereof will be omitted.

The vector processor 180 according to one embodiment may determine whether to allow access a predetermined index position of each lookup table in step 1310 before a gather is performed (step 1030) or a scatter is performed (step 1230). That is, the vector processor 180 may determine an index position of a lookup table on which the gather (step 1030) is to be performed or the scatter (step 1230) is to be performed by determining whether each bank stored in the lookup table is accessible.

In step 1030, vector data may be generated by reading data present at a predetermined index position that is allowed to be accessed in each lookup table. The vector processor 180 according to one embodiment may generate vector data by reading data stored at a predetermined position of a lookup table present in an accessible bank.

In step 1230, the vector data may be stored at a predetermined index position that is allowed to be accessed in each lookup table. The vector processor 180 according to one embodiment may store data at a predetermined position of a lookup table present in an accessible bank.

The vector processor 180 according to one embodiment may be applied to most processors that perform vector operations, such as a general purpose processor, a digital signal processing processor (DSP), an application specific instruction set processor (ASIP), a graphic processing unit, and the like.

Meanwhile, the method may be implemented as computer-readable codes on a computer readable recording medium. The computer readable recording medium includes all kinds of recording apparatuses in which data that may be read by a computer system is stored. For example, the computer readable recording medium includes a read only memory (ROM), a RAM, a compact disc (CD)-ROM, a magnetic tape, a floppy disk, an optical data storage, and the like.

Also, the computer readable recording medium may be distributed to computer systems connected via network, and thus codes that may be read by processors may be stored and executed in a distributed manner.

While the inventive concept has been described in best mode embodiments thereof, alternatives, modifications and variations of the inventive concept should be apparent to those skilled in the art in view of the above description. That is, the claims should be interpreted as including all such alternatives, modifications, and variations of the inventive concept. Therefore, all content contained in the description and drawings should be interpreted as being illustrative and in a non-limiting sense.

The invention claimed is:

1. An apparatus comprising:
   a plurality of memory banks; and
   a controller configured to:
   generate a plurality of lookup tables in which data that is necessary for a vector operation among data stored in the plurality of memory banks is copied and stored; and
   generate vector data by reading the data from the plurality of lookup tables, wherein the controller divides the plurality of memory banks into a predetermined number of groups and generates one lookup table for each of the groups; and the one lookup table generated for each of the groups is stored in a plurality of memory banks included in each of the group.

2. The apparatus of claim 1, wherein the controller includes:
a lookup table generating unit configured to generate the plurality of lookup tables; and
a gather unit configured to read the data from the plurality of lookup tables and generate the vector data.

3. The apparatus of claim 1, wherein:
the one lookup table generated for each of the groups is stored in the plurality of memory banks in an interleaving form.

4. The apparatus of claim 1, wherein the controller accesses each of the lookup tables using an index vector including a plurality of randomly generated indexes and reads data stored at positions of the indexes in each of the lookup tables.

5. The apparatus of claim 1, wherein the controller divides result vector data obtained by performing a predetermined vector operation on the vector data into elements and stores the result vector data divided by elements in the plurality of lookup tables.

6. The apparatus of claim 5, wherein the controller stores each of the elements at a predetermined index position in each of the lookup tables.

7. The apparatus of claim 5, wherein, when a value of data stored in a first index in one of the plurality of lookup tables is changed, the controller updates data stored in a first index in each of the remaining lookup tables, whose value is not changed, with the changed value.

8. The apparatus of claim 5, further comprising a switching unit including a plurality of sub-switch units corresponding to the lookup tables,
wherein the plurality of sub-switch units determine whether to allow the controller to access a predetermined index position of each of the lookup tables.

9. The apparatus of claim 8, wherein:
the plurality of sub-switch units include a plurality of switches corresponding to each of the plurality of memory banks; and
each of the plurality of switches determines whether the controller is accessible by each of the plurality of memory banks.

10. A method comprising:
generating a plurality of lookup tables in which data that is necessary for a vector operation among data stored in the plurality of memory banks is copied and stored; and
generating vector data by reading the data from the lookup tables,
wherein the generating of the plurality of lookup tables includes:
dividing the plurality of memory banks into a predetermined number of groups and generating one lookup table for each of the groups; and
storing the one lookup table generated for each of the groups in a plurality of memory banks included in each of the groups.

11. The method of claim 10, wherein
the storing the one lookup table generated for each of the groups in the plurality of memory banks included in the group comprises storing the one lookup table generated for each of the groups in the plurality of memory banks included in the group in an interleaving form.

12. The method of claim 10, wherein the generating of the vector data by reading the data from the lookup tables includes accessing each of the lookup tables using an index vector including a plurality of randomly generated indexes and reading data stored at positions of the indexes in each of the lookup tables.

13. The method of claim 10, further comprising dividing result vector data obtained by performing a predetermined vector operation on the vector data into elements and storing the result vector data divided by elements in the plurality of lookup tables.

14. The method of claim 13, wherein the storing of the result vector data divided by elements in the plurality of lookup tables includes storing each of the elements at a predetermined index position in each of the lookup tables.

15. The method of claim 13, wherein the storing of the result vector data divided by elements in the plurality of lookup tables includes, when a value of data stored in a first index in any one of the plurality of lookup tables is changed, updating data stored in a first index in each of the remaining lookup tables, whose value is not changed, with the changed value.

16. The method of claim 13, wherein:
the generating of the vector data by reading the data from the lookup tables includes generating the vector data by reading data present at a predetermined index position that is allowed to be accessed in each of the lookup tables; and
the storing of the result vector data divided by elements in the plurality of lookup tables includes storing the result vector data at the predetermined index position that is allowed to be accessed in each of the lookup tables.

17. The method of claim 15, wherein the generating of the vector data by reading the data from the lookup tables and the storing of the result vector data divided by elements in the plurality of lookup tables include determining whether to allow access to each of the memory banks.

18. A non-transitory computer readable recording medium having stored thereon a program which, when executed by a computer, causes the computer to execute a method comprising:
generating a plurality of lookup tables into which data that is necessary for a vector operation from among data stored in a plurality of memory banks is copied and stored; and
generating vector data by reading the data from the lookup tables,
wherein the generating of the plurality of lookup tables includes:
dividing the plurality of memory banks into a predetermined number of groups and generating one lookup table for each of the groups; and
storing the one lookup table generated for each of the groups in a plurality of memory banks included in each of the groups.

* * * * *